United States Patent
Horvitz et al.

(10) Patent No.: US 7,778,820 B2
(45) Date of Patent: Aug. 17, 2010

(54) INFERRING INFORMATIONAL GOALS AND PREFERRED LEVEL OF DETAIL OF ANSWERS BASED ON APPLICATION EMPLOYED BY THE USER BASED AT LEAST ON INFORMATIONAL CONTENT BEING DISPLAYED TO THE USER AT THE QUERY IS RECEIVED

(75) Inventors: Eric J. Horvitz, Kirkland, WA (US); Ingrid Zukerman, Victoria (AU)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/185,753

(22) Filed: Aug. 4, 2008

(65) Prior Publication Data

US 2009/0037398 A1    Feb. 5, 2009

Related U.S. Application Data

(60) Division of application No. 11/047,491, filed on Jan. 31, 2005, now Pat. No. 7,430,505, which is a continuation-in-part of application No. 10/185,150, filed on Jun. 28, 2002, now Pat. No. 7,519,529, which is a continuation of application No. 09/896,187, filed on Jun. 29, 2001, now Pat. No. 7,409,335.

(51) Int. Cl.
*G06F 17/27* (2006.01)
*G06F 17/30* (2006.01)

(52) U.S. Cl. .............................. 704/9; 707/5

(58) Field of Classification Search ........................ None
See application file for complete search history.

(56) References Cited

U.S. PATENT DOCUMENTS 5,197,005 A    3/1993    Shwartz et al.

(Continued)

FOREIGN PATENT DOCUMENTS

WO    WO 9800747    1/1998

(Continued)

OTHER PUBLICATIONS

Microsoft, MS Outlook 2000 SP-3, 2000, Microsoft Corp. 9.0.0.6627.

(Continued)

*Primary Examiner*—Talivaldis Ivars Smits
(74) *Attorney, Agent, or Firm*—Wolf, Greenfield & Sacks, P.C.

(57) ABSTRACT

A system and method for inferring informational goals and preferred level of details in answers in response to questions posed to computer-based information retrieval or question-answering systems is provided. The system includes a query subsystem that can receive an input query and extrinsic data associated with the query and which can output an answer to the query, and/or rephrased queries or sample queries. The query subsystem accesses an inference model to retrieve conditional probabilities that certain informational goals are present. One application of the system includes determining a user's likely informational goals and then accessing a knowledge data store to retrieve responsive information. The system includes a natural language processor that parses queries into observable linguistic features and embedded semantic components that can be employed to retrieve the conditional probabilities from the inference model. The inference model is built by employing supervised learning and statistical analysis on a set of queries suitable to be presented to a question-answering system. Such a set of queries can be manipulated to produce different inference models based on demographic and/or localized linguistic data.

20 Claims, 12 Drawing Sheets

U.S. PATENT DOCUMENTS

| | | |
|---|---|---|
| 5,239,617 A | 8/1993 | Gardner et al. |
| 5,255,386 A | 10/1993 | Prager |
| 5,282,265 A | 1/1994 | Rohra Suda et al. |
| 5,369,575 A | 11/1994 | Lamberti et al. |
| 5,390,281 A | 2/1995 | Luciw et al. |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,694,559 A | 12/1997 | Hobson et al. |
| 5,704,060 A | 12/1997 | Del Monte |
| 5,732,229 A | 3/1998 | Dickinson |
| 5,768,603 A | 6/1998 | Brown et al. |
| 5,812,865 A | 9/1998 | Theimer et al. |
| 5,819,263 A | 10/1998 | Bromley et al. |
| 5,822,410 A | 10/1998 | McCausland et al. |
| 5,835,084 A | 11/1998 | Bailey et al. |
| 5,836,771 A | 11/1998 | Ho et al. |
| 5,864,848 A | 1/1999 | Horvitz et al. |
| 5,920,856 A | 7/1999 | Syeda-Mahmood |
| 5,953,406 A | 9/1999 | LaRue et al. |
| 5,974,135 A | 10/1999 | Breneman et al. |
| 6,021,403 A | 2/2000 | Horvitz et al. |
| 6,032,156 A | 2/2000 | Marcus |
| 6,076,088 A | 6/2000 | Paik et al. |
| 6,100,873 A | 8/2000 | Bayless et al. |
| 6,112,168 A | 8/2000 | Corston et al. |
| 6,205,456 B1 | 3/2001 | Nakao |
| 6,246,981 B1 | 6/2001 | Papineni et al. |
| 6,260,035 B1 | 7/2001 | Horvitz et al. |
| 6,262,730 B1 | 7/2001 | Horvitz et al. |
| 6,285,364 B1 | 9/2001 | Giordano et al. |
| 6,292,555 B1 | 9/2001 | Okamoto |
| 6,353,398 B1 | 3/2002 | Amin et al. |
| 6,366,908 B1 | 4/2002 | Chong et al. |
| 6,466,232 B1 | 10/2002 | Newell et al. |
| 6,484,155 B1 | 11/2002 | Kiss et al. |
| 6,499,013 B1 | 12/2002 | Weber |
| 6,510,406 B1 | 1/2003 | Marchisio |
| 6,513,046 B1 | 1/2003 | Abbott, III et al. |
| 6,549,752 B2 | 4/2003 | Tsukamoto |
| 6,549,915 B2 | 4/2003 | Abbott, III et al. |
| 6,560,576 B1 | 5/2003 | Cohen et al. |
| 6,574,660 B1 | 6/2003 | Pashupathy et al. |
| 6,615,172 B1 | 9/2003 | Bennet et al. |
| 6,625,139 B2 | 9/2003 | Miloslavsky et al. |
| 6,633,859 B1 | 10/2003 | Farlow et al. |
| 6,668,276 B1 | 12/2003 | Ohkado et al. |
| 6,672,506 B2 | 1/2004 | Swartz et al. |
| 6,675,159 B1 | 1/2004 | Lin et al. |
| 6,678,692 B1 | 1/2004 | Hyatt |
| 6,687,241 B1 | 2/2004 | Goss |
| 6,687,696 B2 | 2/2004 | Hofmann et al. |
| 6,701,294 B1 | 3/2004 | Ball et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,826,745 B2 | 11/2004 | Coker et al. |
| 6,837,436 B2 | 1/2005 | Swartz et al. |
| 6,842,877 B2 | 1/2005 | Robarts et al. |
| 6,874,119 B2 | 3/2005 | Macleod Beck et al. |
| 6,944,592 B1 | 9/2005 | Pickering |
| 6,950,753 B1 | 9/2005 | Rzhetsky et al. |
| 6,957,213 B1 | 10/2005 | Yuret |
| 7,010,501 B1 | 3/2006 | Roslak et al. |
| 7,040,541 B2 | 5/2006 | Swartz et al. |
| 7,043,535 B2 * | 5/2006 | Chi et al. ................ 709/218 |
| 7,063,263 B2 | 6/2006 | Swartz et al. |
| 7,171,378 B2 | 1/2007 | Petrovich et al. |
| 7,195,157 B2 | 3/2007 | Swartz et al. |
| 7,385,501 B2 | 6/2008 | Miller et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0047355 A1 | 11/2001 | Anwar |
| 2002/0010574 A1 | 1/2002 | Tsourikov et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078091 A1 | 6/2002 | Vu et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0116174 A1 | 8/2002 | Lee et al. |
| 2002/0169764 A1 | 11/2002 | Kincaid et al. |
| 2003/0046401 A1 | 3/2003 | Abbott et al. |
| 2003/0093792 A1 | 5/2003 | Labeeb et al. |
| 2003/0154476 A1 | 8/2003 | Abbott, III et al. |
| 2004/0201500 A1 | 10/2004 | Miller et al. |
| 2005/0034078 A1 | 2/2005 | Abbott et al. |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0212904 A1 | 9/2006 | Klarfeld et al. |
| 2008/0090591 A1 | 4/2008 | Miller et al. |
| 2008/0091537 A1 | 4/2008 | Miller et al. |
| 2008/0161018 A1 | 7/2008 | Miller et al. |

FOREIGN PATENT DOCUMENTS

WO      WO 0203292 A2      1/2002

OTHER PUBLICATIONS

Andy Harter, et al., A Distributed Location System for the Active Office, IEEE Network, 1994, pp. 62-70.

Bill N. Schilit, et al., Customizing Mobile Applications, Proceedings USENIX Symposium on Mobile and Location Independent Computing, Aug. 1993, 9 pages.

Bill N. Schilit, et al., Disseminating Active Map Information to Mobile Hosts, IEEE Network, 1994, pp. 22-32, vol. 8-No. 5.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bradle J. Rhodes, The Wearable emembrance Agent: A System for Augmented Memory, Personal Technologies Journal Special issue on Wearable Computing, 1997, 12 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Bradley J. Rhodes, The Wearable Remembrance Agent: A System for Augmented Theory, The Proceedings of the First International Symposium on Wearable Computers, Oct. 1997, pp. 123-128.

C. Walsh, "Bayesian Approach," Bayesian Modelling of Short Fatigue Crack Growth and Coalescence. Trinity College of Dublin Doctrol Thesis, Oct. 1999, 4 pages.

C.E. Ramussen, NEuroNet Roadmap: Future Prospects for Neural Networks. Last Updated on Mar. 21, 2001. http://www.kcl.ac.uk/neuronet/about/roadmap/bayesian.html 4 pages.

D. Heckerman and E. Horvitz, Inferring Informational Goals from Free-text Queries: A Bayesian Approach. In Proc. of the Fourteenth Conference on Uncertainty in Artificial Intelligence, pp. 256-265, Jul. 1998.

D. Niedermayer, An Introduction to Bayesian Networks and their Contemporary Applications. Dec. 1, 1998. Available at: http://www.neidermayer.ca/papers/bayesian/index.html 14 pages. Oast viewed on Jul. 18, 2005.

E. Horvitz and T.Lau, Patterns of Search: Analyzing and Modelling web Query Refinement. In Proc. of the Seventh International Conference on User Modelling. pp. 119-128. Jun. 1999.

E. Horvitz, et al., The Lumiere Project: Bayesian User Modelling for Inferring the Goals and Needs of Software Users. In Prof. of the Fourteenth Conference on Uncertainty in Artificial Intelligence, pp. 256-265, Jul. 1998.

Eric Horvitz, et al. Attention-Sensitive Alerting in Computing Systems, Microsoft Research, Aug. 1999.

Eric Horvitz, et al. In Pursuit of Effective Handsfree Decision Support: Coupling Bayesian Inference, Speech Understanding, and User Models, 1995, 8 pages.

Ferret, et al., "QALC—the Questioning-Answering Program of the Language and Cognition Group at LIMSI-CNRS", Proceedings of the Eighth Text Retrieval Conference (TREC-8), 1999, pp. 1-10.

Guanling Chen, et al., A Survey of Context-Aware Mobile Computing Research, Dartmouth Computer Science Technical Report, 2000, 16 pages.

Heyning Adrian Cheng, "Knowledgescapes: A Probabilistic Model for Mining Tacit Knowledge for Information Retrieval," University of California, Berkeley, 2001.

I. Zuckerman and E. Horvitz, Toward Understanding WH-Questions: A Statistical Analysis. Workshop on Machine Learning, Information Retrieval, and User Modelling, Workshop on Machine Learning, Information Retrieval, and User Modelling, Jul. 2001, 10 pages.

International Search Report dated Sep. 29, 2003 for PCT Application Serial No. 00/20685, 3 pages.

J. Rissanen, et al., "Coding and Compression: A happy Union of Theory and Practice", Journal of the American Statistical Association, vol. 95, No. 451, 2000, p. 986-989.

John Prager, et al., Question-Answering by Predictive Annotation, Proceedings of the 23rd Annual International ACM SIGIR Conference on Research and Development in Information Retrieval, ACM Press, 2000, pp. 184-191.

M. Billinghurst, et al., An Evaluation of Wearable Information Spaces, Proeedings, of the Virtual Reality Annual International Symposium, 1998, 8 pages.

Mark Billinghurst, et al., Wearable Devices: New Ways to Manage Information, IEEE Computer Society, Jan. 1999, pp. 57-64.

Mark Billinghurst, Research Directions in Wearable Computing, University of Washington, Ma, 1998, 48 pages.

Mark Weiser, Some Computer Science Issues in Ubiquitous Computing, Communications of the ACM, Jul. 1993, pp. 75-884, vol. 36-No. 7.

Mark Weiser, The Computer for the 21st Century, Scientific American, Sep. 1991, 8 pages.

Martha E. Pollack, "Inferring Domain Plans in Question-Answering", Technical Note 403, SRI International, Dec. 1, 1986.

Marvin Minsky, "Commonsense-Based Interfaces", Communications of the ACM, vol. 43, No. 8, Aug. 2000, p. 67-73.

Marvin Theimer, et al. Operating System issues for PDAs, in Fourth Workshop on Workstation Operating Systems, 1993, 7 pages.

Mike Spreitzer, et al. Architectural Considerations for Scalable, Secure, Mobile Computing with Location Information, In the 14th International Conference on Distributed Computing Systems, Jun. 1994, pp. 29-38.

Mike Spreitzer, et al. Providing Location Information in a Ubiquitous Computing Environment, SIGOPS '93, 1993, pp. 270-283.

Mike Spreitzer, et al. Scalable, Secure, Mobile Computing with Location Information, Communications of the ACM, Jul. 1993, 1 page, vol. 36-No. 7.

Olivier Ferret, et al. QALC—The Question-Answering Program of the Language and Cognition Group at LIMSI-CNRS, Proceedings of the 8th Text Retrieval Conference (TREC-8), 1999, pp. 1-10.

Robert M. Losee, Jr., Minimizing information overload: the ranking of electronic messages, Journal of Information Science 15, Elsevier Science Publishers B.V., 1989, pp. 179-189.

Roy Want, Active Badges and Personal Interactive Computing Objects, IEEE Transactions on Consume Electronics, 1992, 11 pages, vol. 38 No. 1.

Roy Want, et al. The Active Badge Location System, ACM Transactions on Information Systems, Jan. 91-102, vol. 10-No. 1.

Shirley Gregor, et al. "Explanations from Intelligent Systems: Theoretical Foundations and Implications for Practice", MIS Quarterly, vol. 23, No. 4, Dec. 1999, p. 497-530.

T. Joachims, Text categorization with support vector machines: learning with many relevant features, Machine Learning, European Conference on Machine Learning, Apr. 21, 1998, pp. 137-142.

Thad Eugene Starner, Wearable Computing and Contextual Awareness, Massachussets Institute of Technology, Jun. 1999, 248 pages.

Usama Fayyad, et al., "The KDD Process for Extracting Useful Knowledge From Volumes of Data". Communications of the ACM, vo. 39, No. 11, Nov. 1996, p. 27-34.

Warrant Greiff, et al., "The Maximum Entropy Approach and Probabilistic IR Models", ACM Transactions on Information Systems, vol. 18, No. 3, Jul. 2000, p. 246-287.

William Noah Schilt, A System Architecture for Context-Aware Mobile Computing, Columbia University, 1995, 153 pages.

Workshop on Wearable Computing Systems, Aug. 19-21, 1996.

* cited by examiner

INFERRING INFORMATIONAL GOALS AND PREFERRED LEVEL OF DETAIL OF ANSWERS BASED ON APPLICATION EMPLOYED BY THE USER BASED AT LEAST ON INFORMATIONAL CONTENT BEING DISPLAYED TO THE USER AT THE QUERY IS RECEIVED

CROSS REFERENCE TO RELATED APPLICATIONS

This application is a Continuation of U.S. patent application Ser. No. 09/896,187, filed Jun. 29, 2001, entitled, INFERRING INFORMATIONAL GOALS AND PREFERRED LEVEL OF DETAIL OF ANSWERS BASED AT LEAST ON DEVICE USED FOR SEARCHING", now U.S. Pat. 7,409,335. This application is incorporated herein by reference U.S. patent application Ser. No. 10/185,150, filed Jun. 28, 2002, now U.S. Pat. 7,519,529 is a CIP, while U.S. patent application Ser. No. 11/047,491, filed Jan. 31, 2005, now U.S. Pat. 7,430,505 is a DIV of 09/896,187.

TECHNICAL FIELD

The present invention generally relates to information retrieval, and more particularly to predicting high-level informational goals and the appropriate level(s) of detail for an answer from observable linguistic features in queries.

BACKGROUND OF THE INVENTION

As the amount of information available to be retrieved by queries to computers increases, and as the type and number of information consumers seeking to retrieve such information increases, it has become increasingly important to understand the informational goals of the information consumer who generates a query to retrieve such information. Understanding consumer informational goals can improve the accuracy, efficiency and usefulness of a question-answering service (e.g., search service) responding to such queries, which leads to improved information gathering experiences.

Conventional question-answering (QA) systems may employ traditional information retrieval (IR) methods and/or may employ some form of natural language processing (NLP) to parse queries. Such systems may return potentially large lists of documents that contain information that may be appropriate responses to a query. Thus, an information consumer may have to inspect several relevant and/or irrelevant documents to ascertain whether the answer sought has been provided. Such inspection can increase the amount of time spent looking for an answer and reduce the amount of time spent employing the answer. Thus, the efficiency and value of seeking answers through automated question answering systems has been limited.

Data associated with informational goals that may be found in a query may be ignored by conventional systems. Such conventionally ignored data can provide clues concerning what the information consumer seeks (e.g., the type of data an information consumer is seeking, the precision of an answer sought by a query, and other related information in which the information consumer may be interested). Conventional statistical analysis, when applied to information consumer queries, may yield information that can be employed to improve the relevance of documents returned to an information consumer. But the traditional statistical information retrieval approach, even when employing such shallow statistical methods can still be associated with a poor experience for the information consumer employing a question answering system.

Addressing in an automated manner queries posed as questions can be more difficult than addressing traditional keyword-based queries made to search engines. Users presenting well-formed questions (e.g., "What is the capital of Poland?", "Who killed Abraham Lincoln?", "Why does it rain?") typically have a particularly specific information need and corresponding expectations for receiving a well-focused answer. But people presenting keyword-based queries to the Internet may expect and tolerate a list of documents containing one or more keywords that appear in the free-text query.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for inferring informational goals and/or the appropriate level(s) of detail for an answer from a query for information. One application of inferring such informational goals is to enhance responses to questions presented to question answering systems. The present invention improves information retrieval for questions by predicting high-level informational goals and/or the appropriate level(s) of detail from observable linguistic features. The present invention can also be employed in other applications that benefit from inferring informational goals (e.g., marketing, demographics). The system includes a learning method that produces an inference model and a run-time system that employs the inference model to facilitate inferring informational goals. The learning system employs supervised learning with statistical inference methods to produce inference data that can be represented by the inference model. Statistical methods with applicability for building models include Bayesian structure search and parameter optimization, statistical tree induction, support vector machines (SVMs), and neural network methods. The system can be employed to predict informational goals including, but not limited to (1) the type of information requested (e.g., definition of a term, value of an attribute, explanation of an event), (2) the topic and focal point of a question, and (3) the level of detail desired in the answer. The predicted informational goals can then be employed to produce an answer that includes information, rather than simply documents, being produced to the information consumer.

The learning system can retrieve stored information consumer queries from an input query log. Such queries may have been collected from one information consumer and/or one or more groups of information consumers to facilitate localizing the inference model. The learning system employs supervised learning with statistical inference methods to analyze queries for information including, but not limited to, linguistic features and user informational goals. The learning system can produce, for example, one or more Bayesian network and/or decision trees and/or other statistical classification methodology (e.g., support-vector machines) related to the information associated with the queries (e.g., the linguistic features and high-level informational goals) that facilitate assigning probabilities to different informational goals and which thus facilitate increasing the efficiency, accuracy and usefulness of answers produced in response to queries. In one example of the present invention, during a learning phase, queries, drawn from a log of interactions of users with a server, are processed by a natural language processor (NLP) system. The NLP system decomposes and parses queries into a set of linguistic distinctions including, but not limited to, distinctions as parts of speech, logical forms, etc. The distinctions are considered together with the high-level informational goals obtained from human taggers in the process of building predictive models.

The linguistic features that are analyzed during the learning process and/or during the run-time processes can include, but are not limited to, word-based features, structural features and hybrid linguistic features. The high-level informational goals that are analyzed can include, but are not limited to, information need, information coverage wanted by the user, the coverage that an expert would give, the inferred age of the user, the topic of the query, the restrictions of the query and the focus of the query. The results of analyzing such high-level informational goals (e.g., inferring age of user) can thus be employed to facilitate more intelligently and thus more precisely and/or accurately retrieving and/or displaying information via, for example, guided search and retrieval, post-search filtering and/or composition of new text from one or more other text sources.

In one example of the present system, the supervised learning undertaken by the learning system was facilitated by the use of a tagging tool. The tagging tool was operable to present a tagger involved in the supervised learning process with detected linguistic features and to input information from the tagger concerning the detected parts of speech and the informational goals under consideration. Such input information could be employed to manipulate values associated with detected linguistic features.

The system further includes a run time system. The run time system can include a natural language processor, a query subsystem, a knowledge data store, an inference engine and an answer generator that cooperate to receive an input (e.g., a query) and associated extrinsic data and to produce an output that relies, at least in part, on the inference model produced by the learning system.

The query subsystem can be employed to receive user input (parsed and/or unparsed) and extrinsic data associated with the user input and to produce an output. The query subsystem may retrieve content to include in the output from a knowledge data store (e.g., online encyclopedia, online help files). The query subsystem may also produce output that is not an answer to the query. By way of illustration, a user may input a query with internal contradictions or a user may input a query that the query subsystem determines may benefit from re-phrasing. Thus, the query subsystem may produce one or more suggested queries as an output, rather than producing an answer. Such queries may subsequently be employed in a query-by-example system.

The inference engine can be employed to infer informational goals from the user input. The inputs to the inference engine can include, but are not limited to, the user input (parsed and/or unparsed), extrinsic data, and information retrieved from the inference model. The answer generator can be employed to produce an answer to a query. The inputs to the answer generator can include, but are not limited to, the original user input, extrinsic data and informational goals inferred by the inference engine.

Thus, by applying supervised learning with statistical analysis to logs of queries posed to question answering systems, the present invention facilitates predicting informational goals like the type of information requested, the topic, restriction and focal point of the question and the level of detail of the answer, which facilitates increasing the accuracy, efficiency and usefulness of such question answering systems.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
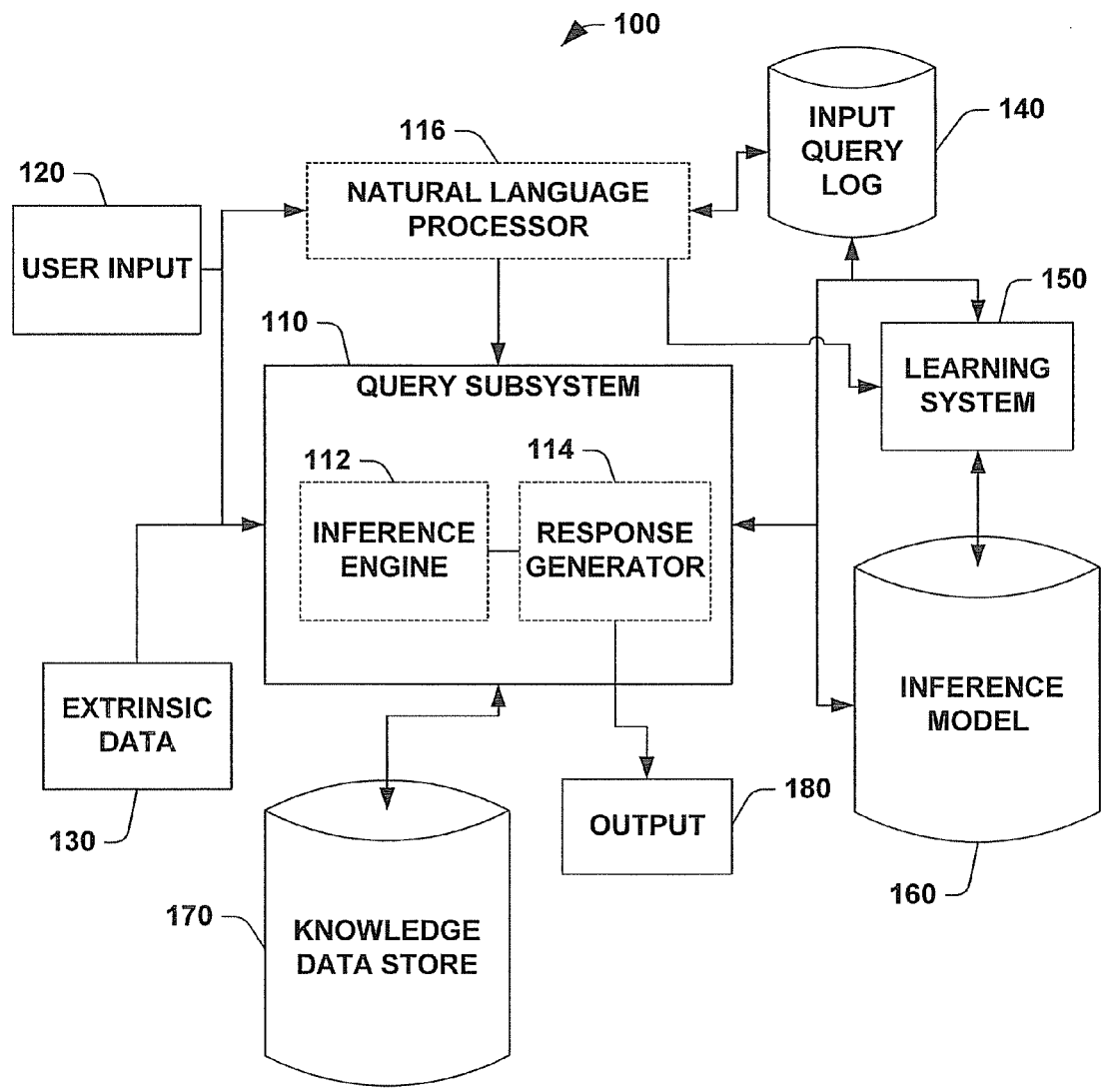
FIG. 1 is a schematic block diagram illustrating a system for inferring informational goals, including both a learning system and a run time system, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

As used in this application, the term "engine" is intended to refer to a computer-related entity, either hardware, a combination of hardware and software, software, or software in execution. For example, an engine may be, but is not limited to, a process running on a processor, a processor, an object, an executable, a thread of execution, a program, and a computer.

As used in this application, the term "natural language processor" is similarly intended to refer to a computer-related entity, either hardware, a combination of hardware and software, software, or software in execution.

As used in this application, the term "data store" is intended to refer to computer-related data storage. Such storage can include both the hardware upon which physical bits are stored and software data structures where logical representations are stored. A data store can be, for example, one or more databases, one or more files, one or more arrays, one or more objects, one or more structures, one or more linked lists, one or more heaps, one or more stacks and/or one or more data cubes. Furthermore, the data store may be located on one physical device and/or may be distributed between multiple physical devices. Similarly, the data store may be contained in one logical device and/or may be distributed between multiple logical devices.

It is to be appreciated that various aspects of the present invention may employ technologies associated with facilitating unconstrained optimization and/or minimization of error costs. Thus, non-linear training systems/methodologies (e.g., back propagation, Bayesian learning, decision trees, non-linear regression, or other neural networking paradigms and other statistical methods) may be employed.

Referring initially to FIG. 1, a schematic block diagram illustrates a system 100 for inferring informational goals in queries, and thus for enhancing responses to queries presented to an information retrieval system (e.g., a question answering system). The system 100 includes a query subsystem 110 that is employed in processing a user input 120 and extrinsic data 130 to produce an output 180. The user input 120 can be, for example, a query presented to a question answering application. The extrinsic data 130 can include, but is not limited to, user data (e.g., applications employed to produce query, device employed to generate query, current content being displayed), context (e.g., time of day, location from which query was generated, original language of query) and prior query interaction behavior (e.g., use of query by example (QBE), use of query/result feedback). The output 180 can include, but is not limited to, one or more responses, an answer responsive to a query in the user input 120, one or more re-phrased queries, one or more suggested queries (that may be employed, for example, in a QBE system) and/or an error code.

In an exemplary aspect of the present invention, when the output 180 takes the form of one or more responses, the one or more responses may vary in length, precision and detail based, at least in part, on the inferred informational goals associated with the query that produced the one or more responses. In another exemplary aspect of the present invention, the output 180 may be subjected to further processing. For example, if the output 180 takes the form of two or more responses, then the responses may be ranked by a ranking process to indicate, for example, the predicted relevance of the two or more responses. Similarly, the output 180 may be further processed by a text focusing process that may examine the output 180 to facilitate locating and displaying the piece(s) of information most relevant to the query. Further, the output 180 may be processed, for example, by a diagramming process that displays information graphically, rather than textually.

It is to be appreciated that the term "user" and the term "information consumer" contemplate both human and automated query generators. For example, a human using a Web browser may generate a query that can be processed by the system. Similarly, an information gathering computer application may generate a query that can be processed by the system. Thus, the present invention is not intended to be limited to processing queries produced by humans.

The query subsystem 110 can include an inference engine 112 and an answer generator 114. The query subsystem 110 can also receive the user input 120 via a natural language processor 116. The natural language processor 116 can be employed to parse queries in the user input 120 into parts that can be employed in predicting informational goals. The parts may be referred to as "observable linguistic features". By way of illustration, the natural language processor 116 can parse a query into parts of speech (e.g., adjectival phrases, adverbial phrases, noun phrases, verb phrases, prepositional phrases) and logical forms. Structural features including, but not limited to, the number of distinct parts of speech in a query, whether the main noun in a query is singular/plural, which noun (if any) is a proper noun and the part of speech of the head verb post modifier can also be extracted from output produced by the natural language processor 116.

The inference engine 112 can be employed to infer informational goals in queries in the user input 120. The inference engine 112 may access parse data produced by the natural language processor 116 and an inference model 160 to facilitate inferring such informational goals. For example, the number, type and location of noun phrases and adjectival phrases determined by the natural language processor 116 may be employed to access one or more decision trees in the inference model 160 to predict informational goals. Such high level informational goals can include, but are not limited to, information need, information coverage(s) desired by the user, information coverage that an expert would provide, the inferred age of the user, the topic of the query and the focus of the query.

The results of analyzing such high-level informational goals (e.g., inferring age of user) can thus be employed to facilitate more intelligently and thus more precisely and/or accurately retrieving information via, for example, guided search and retrieval, post-search filtering and/or composition of new text from one or more other text sources. By way of illustration, and not limitation, if the age of a user is inferred as being under thirteen, then a first set of resources may be searched and/or a first post-search filter may be employed. For example, an encyclopedia designed for children may be searched and an eight letter post-search word size filter may be employed. By way of further illustration, if the age of a user is inferred as being between thirty and forty, then a second set of resources (e.g., regular adult encyclopedia) may be searched and a second post-search filter (e.g., word sizes up to fourteen letters) may be employed.

The inference engine 112 can also be employed to infer one or more preferred levels of detail for an answer. Such levels of detail may depend, for example, in addition to the information retrieved from a query, on the inferred age of the user, on the physical location of a user (e.g., user on cell phone browser desires less information than user on workstation), the organizational location of a user (e.g., CEO desires different level of detail than mail clerk), one or more relationships in which the user is engaged (e.g., intern/attending, partner/associate, professor/student) and an application being employed by the user. Once one or more levels of detail are inferred, such levels of detail may be employed, for example, to determine whether a new text source should be created from a set of text resources. For example, if the level of detail inference indicates that a high-level executive summary is desired then a summary document may be produced that incorporates text from one or more other resources. Thus, the executive can be presented with a single document rather than being forced to wade through a number of documents to retrieve the desired information.

By way of illustration and not limitation, the relationships in which a user may be engaged may be employed to infer the level of detail in an answer. For example, although a user may prefer a short answer to a question, a pedagogue may prefer to provide a longer answer as part of educating the user. Consider a student presenting a question to a math professor. While the student may simply desire the answer (2x) to the question "What is the derivative of x2?", the teacher may prefer to provide a more general answer (e.g., the derivative of simple equations of the form axn is naxn-1) so that the student may gain more than just the answer. Other relationships, and the current context of the parties in the relationship, may similarly facilitate inferring a level of detail for an answer. For example, while an attending physician may provide a first "teaching" answer to an intern treating a non-emergent patient, the attending physician may provide a second "life-saving" answer to the same intern while treating an emergent patient who is in imminent danger of bleeding out.

The query subsystem 110 can also include an answer generator 114. The answer generator 114 can, for example, receive as input predictions concerning informational goals and can access, for example, the knowledge data store 170 to retrieve information responsive to the query in the user input 120. The answer generator may also produce responses that are not answers, but that include rephrased queries and/or suggested queries. For example, the query subsystem 110 may determine that the amount and/or type of information sought in a query is so broad and/or voluminous that refining the query is appropriate. Thus, the answer generator 114 may provide suggestions for refining the query as the response to the query rather than producing an answer.

The system 100 can also include a learning system 150 that accepts as inputs selected data and/or selected queries from an input query log 140 (hereinafter the query log) to produce the inference model 160. Queries from the query log 140 may be passed to the learning system via the natural language processor 116. The natural language processor 116 can parse queries from the query log 140 into parts that can be employed in learning to predict informational goals. The parts may also be referred to as "observable linguistic features".

The query log 140 can be constructed, for example, by gathering queries from the user input 120 (e.g., queries) and/or extrinsic data 130 presented to a question answering system. Such queries and/or data may be collected from one information consumer and/or one or more groups of information consumers. Collecting queries from a heterogeneous group facilitates training a system that can be widely used by different information consumers. Collecting queries from a group of homogenous information consumers facilitates training a system that can be localized to that group while collecting queries from a single information consumer facilitates training a system that can be customized to that individual consumer. In addition to queries, the query log 140 can contain historical data concerning queries, which facilitates analyzing such queries. Further, the query log 140 may contain additional information associated with actual informational goals that can be compared to predicted information goals, with such actual informational goals employable in supervised learning. In one example of the present invention, a query log containing "WH" questions (e.g., who, what, where, when, why, how) and containing an imperative (e.g., name, tell, find, define, describe) was employed. Employing such a specialized query log 140 can facilitate understanding informational goals in different types of queries, which can in turn increase the accuracy of the response to such queries. Although a query log 140 is described in connection with FIG. 1, it is to be appreciated that the query log 140 may be manually generated on an ad hoc basis, for example, by a question generator, rather than by collecting queries presented to an actual question answering system. By way of illustration, in a laboratory environment, a linguist interested in applying supervised learning to an informational goal inferring system may sit at an input terminal and generate a thousand queries for input to the learning system 150, without ever physically storing the collection of queries. In this illustration, queries from the query log 140 are being consumed as created and may not, therefore, be stored as a complete set in any physical device.

The learning system 150 can employ both automated and manual means for performing supervised learning, with the supervised learning being employed to construct and/or adapt data structures including, but not limited to, decision trees in the inference model 160. Such data structures can subsequently be employed by the inference engine 112 to predict informational goals in a query in the user input 120. Predicting the informational goals may enhance the response to a query by returning a precise answer and/or related information rather than returning a document as is commonly practiced in conventional information retrieval systems. By way of illustration, the present invention can provide answers of varying length and level of detail as appropriate to a query. In this manner, an exemplary aspect of the present invention models the expertise of a skilled reference librarian who can not only provide the requested answer but understand the subtleties and nuances in a question, and identify an "appropriate" answer to provide to the querying user. For example, presented with the query "What is the capital of Poland?" traditional question answering systems may seek to locate documents containing the terms "capital" and "Poland" and then return one or more documents that contain the terms "capital" and "Poland". The information consumer may then be forced to read the one or more documents containing the terms to determine if the answer was retrieved, and if so, what the answer is. The present invention, by inferring informational goals, identifies conditions under which a more extended reply, such as "Warsaw is the capital and largest city of Poland, with a population of approximately 1,700,00" is returned to the user. The present invention may, for example, set values for several variables employed in analyzing the query (e.g., Information Need set to "Attribute"; Topic set to "Poland"; Focus set to "capital"; Cover Wanted set to "Precise", and Cover Would Give set to "Additional"). Further, the present invention may determine that pictures of landmarks, a city street map, weather information and flight information to and from Warsaw may be included in an appropriate reply. These informational goals are predicted by analyzing the observable linguistic features found in the query and retrieving conditional probabilities that certain informational goals exist from the inference model 160 based on those observable linguistic features. The inference model 160 can be constructed by employing supervised learning with statistical analysis on queries found in one or more query logs 140. The inference model 160 can then be employed by a "run time system" to facilitate such enhanced responses.

In one example of the present invention, the learning system 150 and/or the inference engine 112 can further be adapted to control and/or guide a dialog that can be employed to clarify information associated with informational goals, desired level of detail, age and so on. By way of illustration and not limitation, the learning system 150 may make an inference (e.g., age), but then may present a user interface dialog that facilitates clarifying the age of the user. Thus, the learning system 150 may be adapted, in-situ, to acquire more accurate information concerning inferences, with resulting increases in accuracy. Such increased accuracy may be important, for example, in complying with Federal Regulations (e.g., Children's Online Privacy Protection Act). By way of further illustration, the inference engine 112 may make an inference (e.g., level of detail in answer), but then may present a user interface that facilitates clarifying the desired level of detail in an answer. Thus, the inference engine 112 may adapt processes employed in generating an inference, and may further adapt search and retrieval processes and/or post-search filtering processes to provide a closer fit between returned information and desired coverage.

Figure 2:
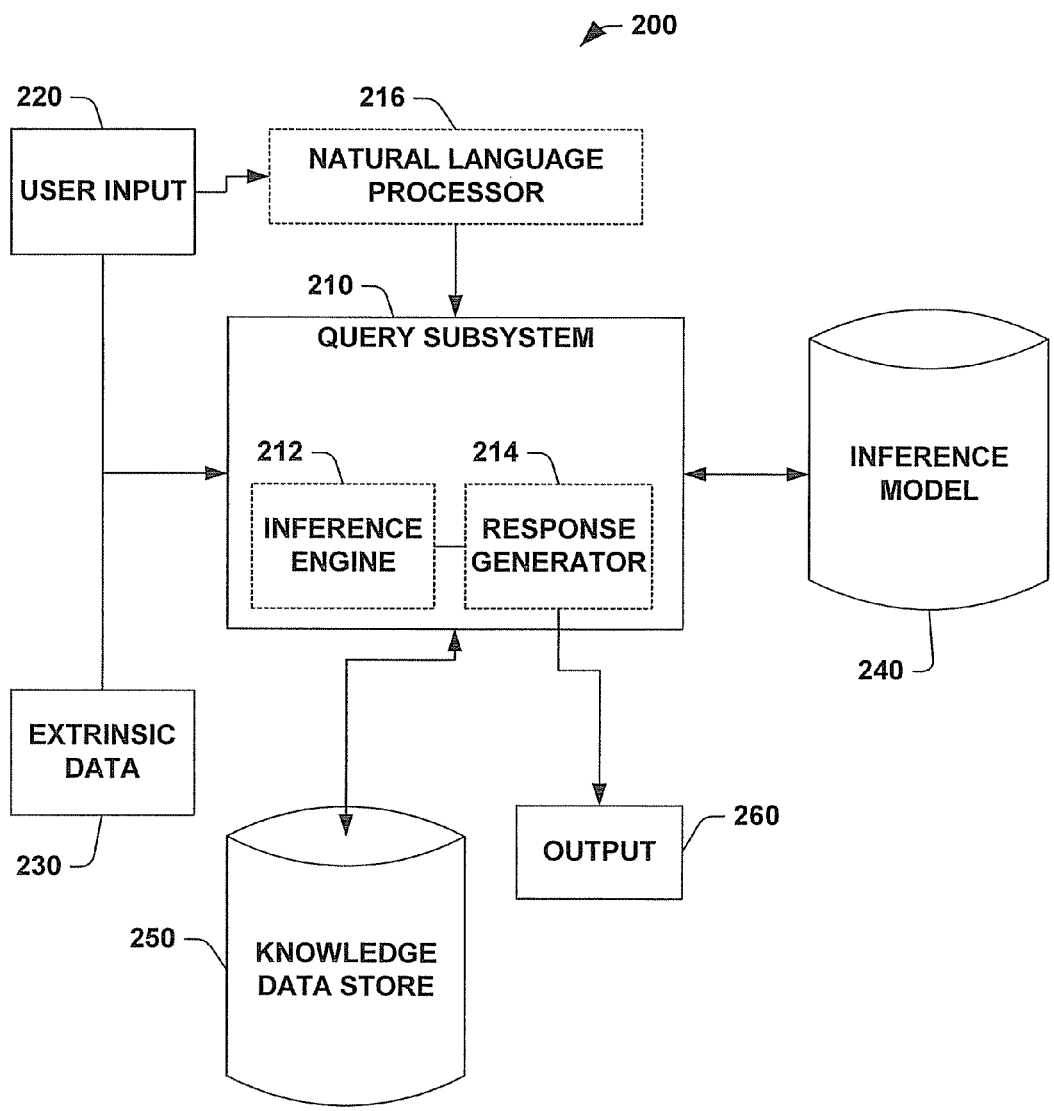
FIG. 2 is a schematic block diagram illustrating a run time system for inferring informational goals, in accordance with an aspect of the present invention.

Thus, turning now to FIG. 2, a run time system 200 that can access an inference model 240 to infer informational goals and thus enhance responses to queries presented to the run time system 200 is illustrated. The run time system 200 may reside on one computer and/or may be distributed between two or more computers. Similarly, the run time system 200 may reside in one process and/or may be distributed between two or more processes. Further, the one or more computers and/or one or more processes may employ one or more threads.

The run time system 200 receives data from a user input 220 and may also receive an extrinsic data 230. The user input 220 can include one or more queries for information. The run time system 200 may receive queries directly and/or may receive parse data from a natural language processor 216. The queries may appear simple (e.g., what is the deepest lake in Canada?) but may contain informational goals that can be employed to enhance the response to the query. For example, the query "what is the deepest lake in Canada?" may indicate that the user could benefit from receiving a list of the ten deepest lakes in Canada, the ten shallowest lakes in Canada, the ten deepest lakes in neighboring countries, the ten deepest lakes in the world and the ten deepest spots in the ocean. Thus, rather than returning a document that contains the words "deepest", "lake", and "Canada", which forces the information consumer to read through one or more documents to figure out whether the query was answered, the run time system 200 can provide information. While there are time and processing costs associated with inferring the informational goals, retrieving the information and presenting the information to the information consumer, the benefit of providing information rather than documents can outweigh that cost, producing an enhanced information gathering experience.

To facilitate enhancing the informational retrieval experience, the run time system 200 may also examine extrinsic data 230. The extrinsic data 230 can include, but is not limited to, user data (e.g., applications employed to produce query, device employed to generate query, current content being displayed), context (e.g., time of day, location from which query was generated, original language of query) and prior query interaction behavior (e.g., use of query by example (QBE), use of query/result feedback). The user data (e.g., device generating query) can provide information that can be employed in determining what type and how much information should be retrieved. By way of illustration, if the device generating the query is a personal computer, then a first type and amount of information may be retrieved and presented, but if the device generating the query is a cellular telephone, then a second type and amount of information may be retrieved and presented. Thus, the informational goals of the user may be inferred not only from the observable linguistic features of a query, but also from extrinsic data 230 associated with the query.

The run time system 200 includes a query subsystem 210, which in turn includes an inference engine 212 and an answer generator 214. The query subsystem 210 accepts parse data produced by a natural language processor 216. The natural language processor 216 takes an input query and produces parse data including, but not limited to, one or more parse trees, information concerning the nature of and relationships between linguistic components in the query (e.g., adjectival phrases, adverbial phrases, noun phrases, verb phrases, prepositional phrases), and logical forms. The query subsystem 210 subsequently extracts structural features (e.g., number of distinct points of speech in a query, whether the main noun in a query is singular/plural, which noun (if any) is a proper noun and the part of speech of the head verb post modifier) from the output of the natural language processor 216. Such parse data can then be employed by the inference engine 212 to, for example, determine which, if any, of one or more data structures in the inference model 240 to access. By way of illustration, first parse data indicating that a first number of nouns are present in a first query may lead the inference engine 212 to access a first data structure in the inference model 240 while second parse data indicating that a certain head verb post modifier is present in a second query may lead the inference engine 212 to access a second data structure in the inference model 240. By way of further illustration, the number of nouns and the head verb post-modifier may guide the initial access to different decision trees (e.g., one for determining information need, one for determining focus) and/or the number of nouns and the head verb post-modifier may guide the access to successive sub-trees of the same decision tree.

Based, at least in part, on information retrieved from the inference model 240, the inference engine 212 will determine which, if any, informational goals can be inferred from a query. If one or more informational goals can be inferred, then the inference engine 212 may perform informational goal selection to determine, which, if any, informational goals should be employed by the response generator 214 to produce a response to the query. By way of illustration, if conflicting informational goals are inferred from the query, then the inference engine 212 may direct the response generator 214 to produce sample queries that can be employed in subsequent query by example processing by an information consumer. By way of further illustration, if the inference engine 212 determines that a specific informational goal can be inferred from the query, then the inference engine 212 may direct the response generator 214 to retrieve a certain type and/or volume of information that will be responsive to the query and its embedded informational goals. Thus, by employing the parse data generated by the natural language processor 216 and the information stored in the inference model 240, the information gathering experience of an information consumer employing the run time system 200 is enhanced as compared to conventional document retrieval systems.

Figure 3:
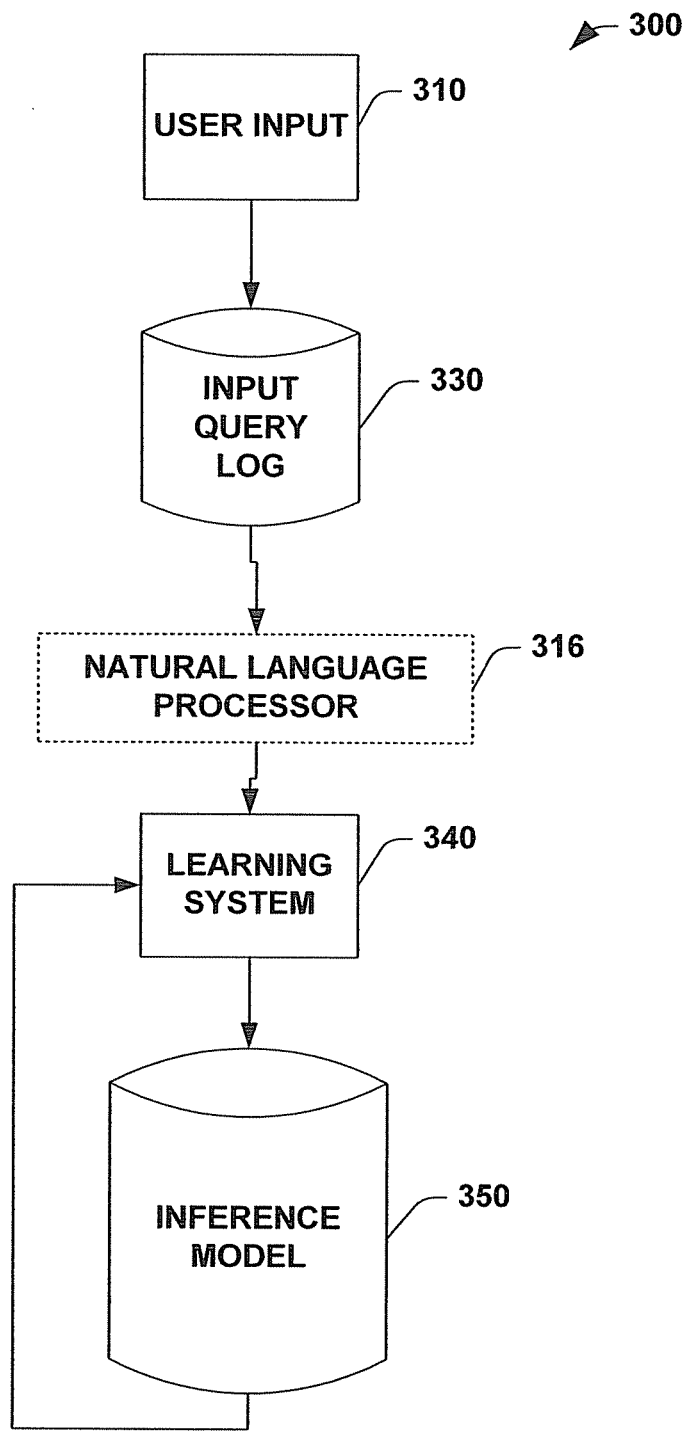
FIG. 3 is a schematic block diagram illustrating a learning system employed in creating and/or updating an inference model that can be employed by a run time system for inferring informational goals, in accordance with an aspect of the present invention.

Thus, referring now to FIG. 3, a training system 300 that can be employed to create and/or update an inference model 350 is illustrated. The training system 300 may reside on one computer and/or may be distributed between two or more computers. Similarly, the training system 300 may reside in one process and/or may be distributed between two or more processes. Further, the one or more computers and/or one or more processes may employ one or more threads.

The training system 300 includes an input query log 330 that can be constructed, for example, by gathering queries, parse data, and/or extrinsic data presented to a question answering system. The input query log 330 can be implemented in, for example, one or more files, one or more databases, one or more arrays, one or more structures, one or more objects, one or more linked lists, one or more heaps and/or one or more data cubes. The input query log 330 can be stored on one physical device and/or can be distributed between two or more physical devices. Similarly, the input query log 330 can reside in one logical data structure and/or can be distributed between two or more data structures. Furthermore, the input query log 330 may also be implemented in a manual store. By way of illustration, a technician may manually input queries to the natural language processor 316, where the queries are fabricated in the technician's mind at the time of entry. By way of further illustration, a technician may manually input queries to the natural language processor 316, where the queries are taken from one or more lists of queries recorded, for example, on paper, or on some separate magnetic or optical media.

The queries, parse data, and/or extrinsic data can be referred to collectively as user input 310. The user input 310, via the input query log 330, can be provided to a learning system 340 via a natural language processor 316. The learning system 340 can include automated and/or manual means for analyzing the user input 310. Results from analysis performed on the user input 310 by the learning system 340 can be employed to create and/or adapt an inference model 350. By way of illustration, an existing inference model 350 can be adapted by the learning system 340 based on analyses performed on additional user input 310 while a new inference model 350 can be constructed from initial analyses of user input 310.

The learning system 340 can be employed to compute conditional probabilities concerning the likelihood of one or more informational goals based on user input 310. The conditional probabilities can be associated with observable linguistic features and/or relationships between such linguistic features. The learning system 340 can collect linguistic data concerning observed linguistic features, and automated and/or manual means can be employed to manipulate the linguistic data. The linguistic data may indicate, for example, that three nouns are located in a query, and a relationship between the number, type and location of the nouns.

The linguistic data can then be subjected to statistical analysis to compute decision trees and/or conditional probabilities based on the observed linguistic features and the linguistic data. Statistical methods of use for building inferential models from this data include Bayesian networks, Bayesian dependency graphs, decision trees, and classifier models, such as naïve Bayesian classifiers and Support Vector Machines (SVM). Bayesian statistical analysis is known in the art and thus, for the sake of brevity, Bayesian statistical analysis is discussed in the context of the analysis applied to observable linguistic features in accordance with the present invention.

The inference model 350 that can be adapted by the learning system 340 can incorporate prior knowledge concerning inferring informational goals. For example, an inference model 350 may model prior knowledge that a first verb (e.g., list, "describe the presidents") can be employed to infer that an information consumer desires a broad coverage in the information produced in response to a query while a second verb (e.g., name, "name the 12th president") can be employed to infer that an information consumer desires a precise response. Thus, the inference model 350 may start with this prior knowledge and be updated by the learning system 340. Thus, continued refinements to inference models are facilitated.

Through the application of Bayes formula the conditional probability that an informational goal can be inferred from the presence and/or absence of one or more observable linguistic features and/or relationships between such observable linguistic features is facilitated. By way of illustration, in one example aspect of the present invention, the inferred informational goals accurately reflected, at least seventy five percent of the time, actual informational goals of a consumer offering a question with less than seven words. By way of further illustration, in another example aspect of the present invention, the inferred informational goals accurately reflected, at least sixty percent of the time, actual informational goals of a consumer offering a question with seven or more words. Such accuracy provides enhanced information retrieval to an information consumer. For example, information at an appropriate level of abstraction may be provided.

While the discussion associated with FIG. 3 deals with inferring informational goals to enhance answer retrieval, it is to be appreciated that such informational goals may be employed in other processes. By way of illustration, inferred informational goals may be employed in processes including, but not limited to, targeting advertising, performing link recommendation, facilitating age determination and/or demographic modeling. Thus, it is to be appreciated that although enhancing answer responsiveness is one application of inferring informational goals, the present invention is not limited to such application.

Figure 4:
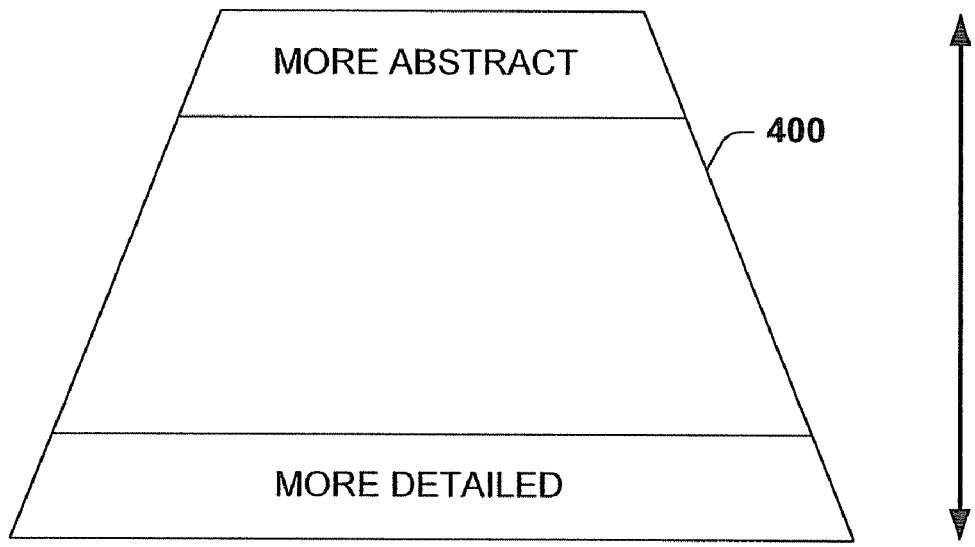
FIG. 4 is a schematic block diagram illustrating a hierarchy of detail of knowledge.

Thus, referring now to FIG. 4, a hierarchy 400 of detail/abstraction of knowledge is illustrated. The hierarchy 400 illustrates that answers whose return is facilitated by the present invention may include more detailed information, or more abstract information, based, at least in part, on informational goals inferred from observable linguistic features in a query. For example, a first query may include observable linguistic features from which an inference can be made that a precise, detailed answer is desired (e.g., "In which pathways does the protein PTPμ regulate cell growth?") while a second query may include observable linguistic features from which an inference can be made that a more abstract answer is desired (e.g., How are PTPμ and retinoblastoma related?). Thus, as compared to a list of documents typically returned by conventional information retrieval systems, the present invention facilitates returning information that may vary in content, length, detail and abstraction level, which improves information retrieval experiences.

Figure 5:
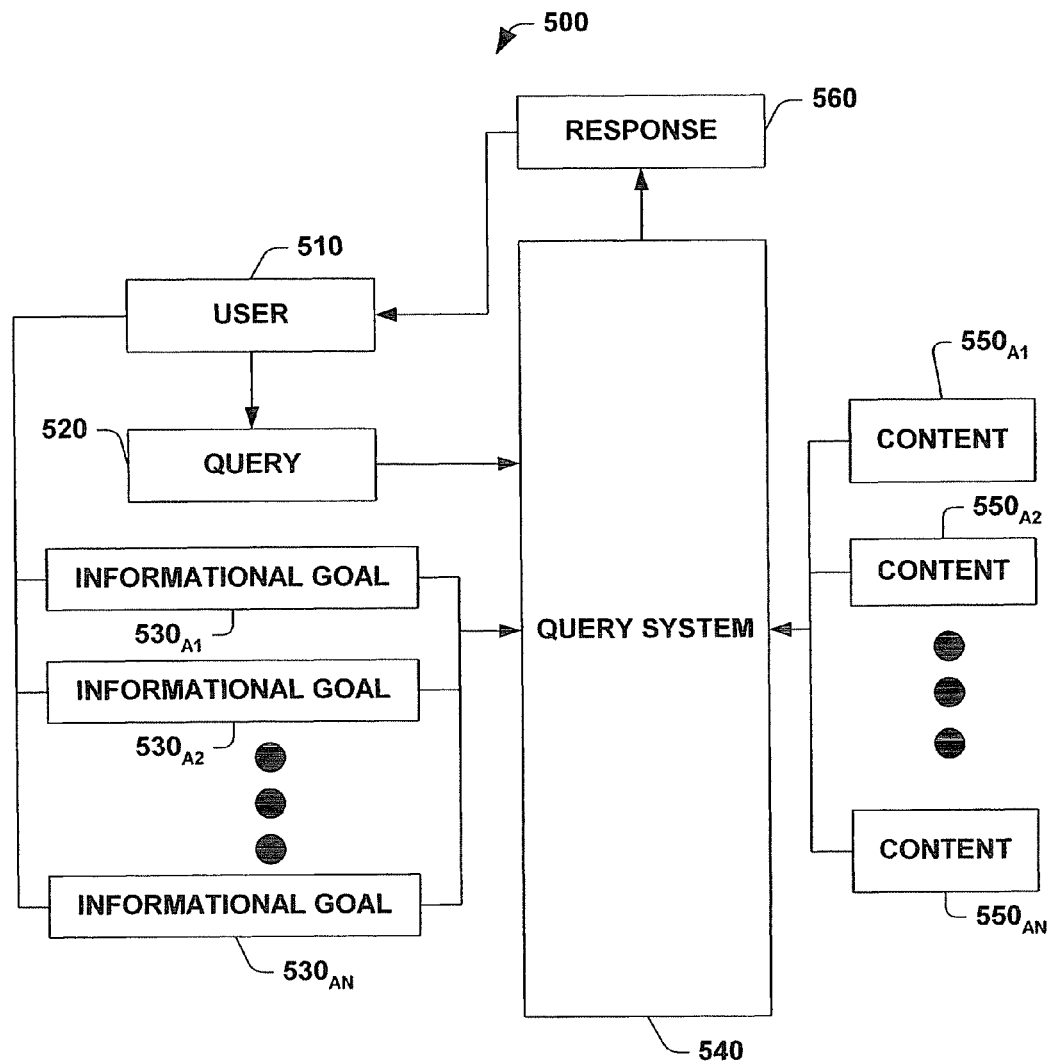
FIG. 5 is a schematic block diagram illustrating inferred informational goals being employed by a query system to select content to return in response to a query, in accordance with an aspect of the present invention.

Referring now to FIG. 5, a system 500 for inferring informational goals being employed by a query system 540 to select content to return in response to a query 520 is illustrated. A user 510 may present a query 520 to the query system 540. The query 520 may be associated with one or more informational goals 530A1, 530A2 through 530An, n being an integer (referred to collectively as the informational goals 530). Conventionally, the informational goals 530 may not be retrieved from the query 520. But the present invention facilitates inferring the high level informational goals 530 from the observable linguistic features in the query 520.

The high-level informational goals 530 can include, but are not limited to, information need, information coverage wanted by the user, the coverage that a query would give, the topic of the query and the focus of the query.

The high-level informational goal referred to as "information need" concerns the type of information requested in a query. Information need types can include, but are not limited to, attribute, composition, identification, process, reason, list and target itself. For example, a query "what is a hurricane?" could have the high-level information goal information need established as an "identification" query. Similarly, a query "where can I find a picture of a horse?" could have the high-level information goal information need established as a "topic itself" query. A topic itself query represents queries seeking access to an object rather than information concerning an object.

The high-level informational goals referred to as "coverage wanted" and "coverage would give" concern the level of detail to be provided in an answer to a query. Coverage wanted represents the level of answer detail requested by the query while coverage would give represents the level of answer detail that is as most likely to assist the user in their information quest. Coverage wanted and coverage would give types include, but are not limited to, precise, additional, extended and other. For example, the type "precise" indicates that a query seeks an exact answer (e.g., "who was the 14th president").

The high-level information goals referred to as "topic" and "focus" concern the linguistic feature representing the topic of discussion in a query and what the information consumer wants to know about that topic of discussion. While five such informational goals 530 are described herein (e.g., information need, coverage wanted, coverage would give, topic, focus), it is to be appreciated that a greater or lesser number of informational goals may be employed in conjunction with the present invention.

Based on the high level information goals 530 inferred from the observable linguistic features in the query 520, one or more content sources (e.g., content source 550A1, 550A2 through 550An, n being an integer, referred to collectively as the content sources 550) may be accessed by the query system 540 to produce a response 560 to the query 520. The content sources 550 can be, for example, online information sources (e.g., newspapers, legal information sources, CD based encyclopedias). Based on the informational goals 530 inferred from the query 520, the query system 540 can return information retrieved from the content sources 550, rather than returning documents containing matching keywords, thus providing an advantage over conventional information retrieval systems. Further, the information can vary in aspects including, but not limited to, content, length, scope and abstraction level, for example, again providing an improvement over conventional systems.

Figure 6:
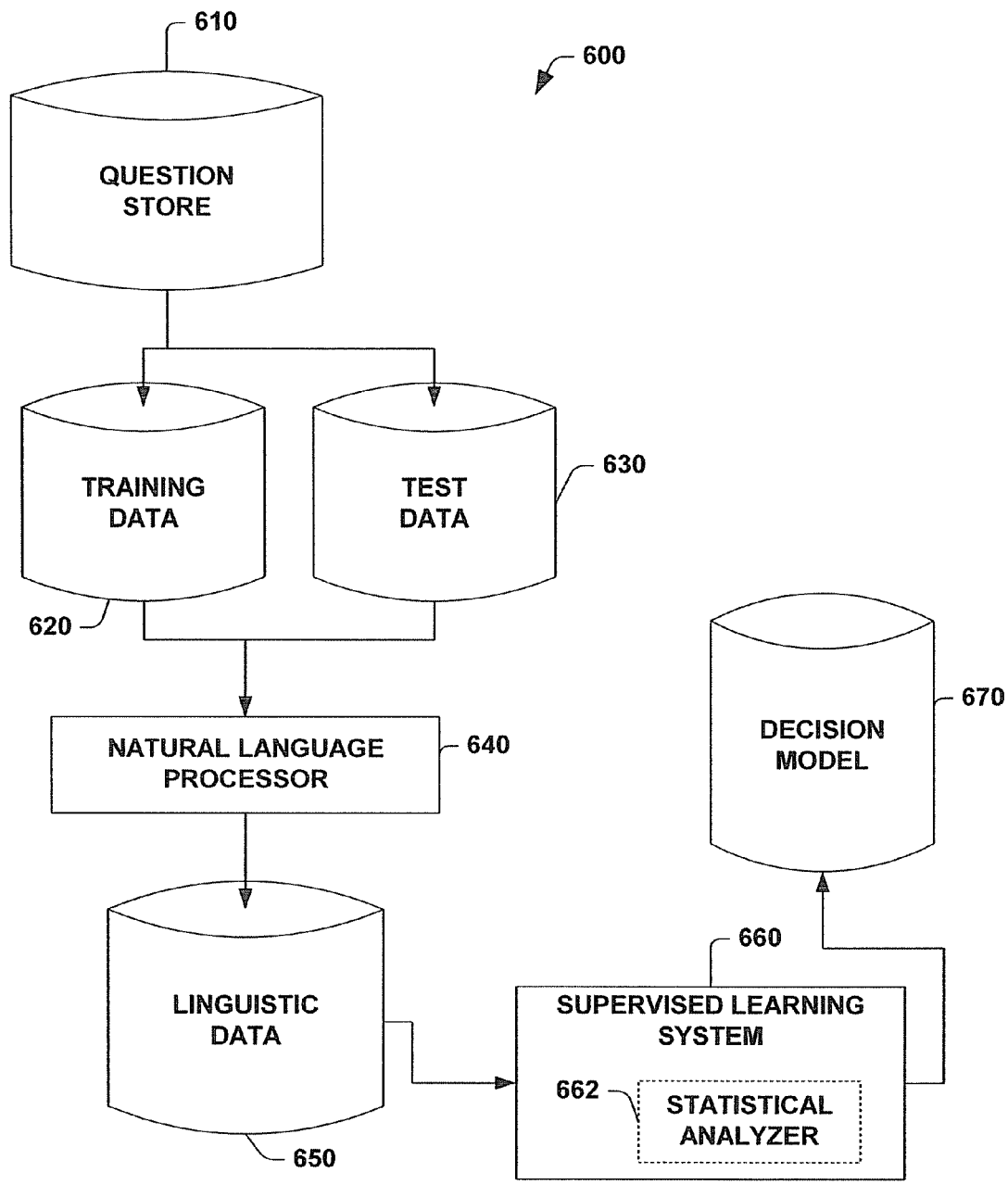
FIG. 6 is a schematic block diagram illustrating a training system employing natural language processing, supervised learning with statistical analysis in accordance with an aspect of the present invention.

Referring now to FIG. 6 a training system 600 including a natural language processor 640, a supervised learning system 660 and a Bayesian statistical analyzer 662 is illustrated. The training system 600 includes a question store 610 as a source of one or more sets of questions suitable for posing to a question answering system. The question store 610 may be a data store and/or a manual store. The question store 610 can be configured to facilitate specific learning goals (e.g., localization). By way of illustration, questions posed from a certain location (e.g., Ontario) during a period of time (e.g., Grey Cup Week) to an online question answering service may be stored in the question store 610. The questions may be examined by a question examiner (e.g., linguist, cognitive scientist, statistician, mathematician, computer scientist) to determine question suitability for training, with some questions being discarded. Further, the questions in the question store 610 may be selectively partitioned into subsets including a training data subset 620 and a test data subset 630. In one example aspect of the present invention, questions in the question store 610, the training data 620 and/or the test data 630 may be annotated with additional information. For example, a linguist may observe linguistic features and annotate a question with such human observed linguistic features to facilitate evaluating the operation of the natural language processor 640. Similarly, a question examiner may annotate a question with actual informational goals to facilitate training and/or evaluating the operation of the supervised learning system 660 and/or the statistical analyzer 662.

The training system 600 can present questions and/or annotated data from the training data 620 to the natural language processor 640 that can then observe linguistic features in the question. Such observed linguistic features can be employed to generate linguistic data that can be stored in a linguistic data data store 650. For example, the linguistic data can include, but is not limited to types, numbers and/or locations of parts of speech (e.g., adjectival phrases, adverbial phrases, noun phrases, verb phrases, prepositional phrases), number of distinct parts of speech, existence, location and/or number of proper nouns, type of head-verb (e.g., can, be, do, action verbs) and any head-verb modifiers (e.g., what, when, where, how adverb, how adjective).

The system 600 can provide linguistic data from the linguistic data data store 650 to the supervised learning system 660. Since statistical learning to build decision trees is employed in the present invention, the supervised learning system 660 may either establish a decision model 670 (e.g., a decision tree) and/or update a decision model 670. The decision model 670 can store information concerning the likelihood that certain informational goals are associated with a question, with the conditional probabilities being computed by the statistical analyzer 662. A process and/or human associated with the supervised learning system 660 may examine a question, examine the inferences and/or probabilities associated with the question in the decision model 670 and determine that manipulations to the inferences and/or probabilities are required. Further, the process and/or human associated with the supervised learning system 660 may examine a question and the inferences and/or probabilities associated with the question in the decision model 670 and determine that one or more parameters associated with the statistical analyzer 662 and/or automated processes associated with the supervised learning system 660 require manipulation. In this manner, different decision models 670 may be produced with biases towards inferring certain informational goals, which facilitates localizing such decision models 670. Such localization can provide improvements over conventional systems.

Figure 7:
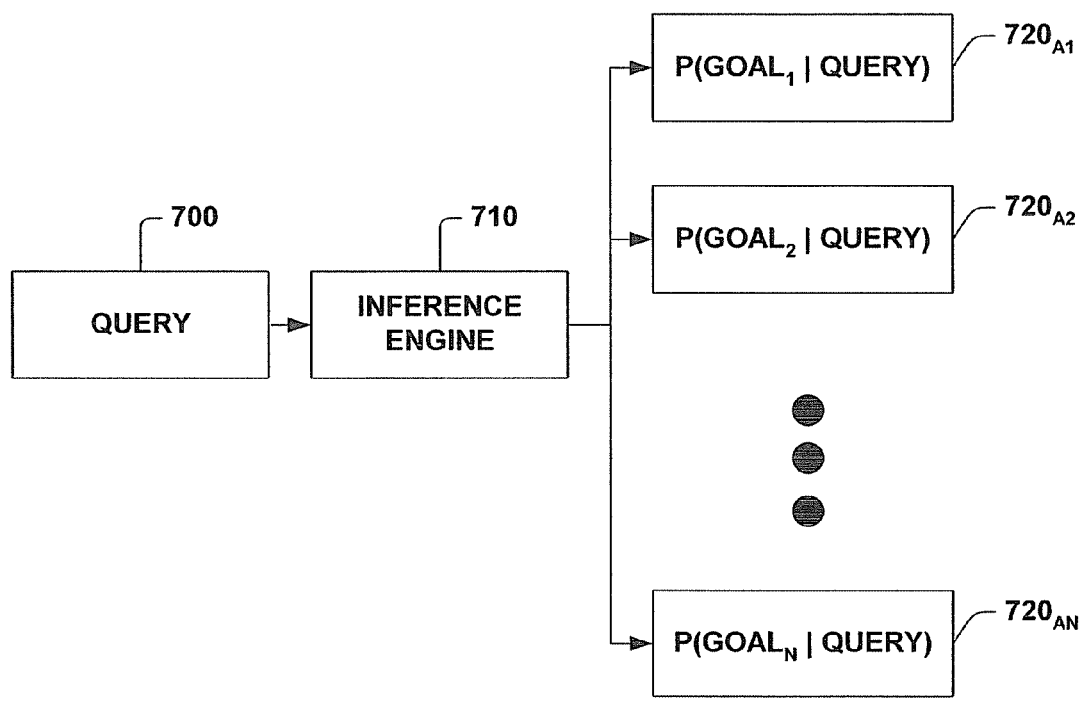
FIG. 7 is a schematic block diagram illustrating conditional probabilities associated with determining a probability distribution over a set of goals associated with a query, in accordance with an aspect of the present invention.

Referring now to FIG. 7, conditional probabilities associated with analyzing a probability distribution over a set of goals associated with a query 700 are illustrated. A goal of statistical analysis (e.g., Bayesian assessment) and inference employed in the present invention is to infer a probability distribution over a set of goals given a query 700. The set of probabilities employed in inferring the probability distribution can be accessed by an inference engine 710 to facilitate determining which informational goals, if any, should be inferred from the probability distribution. Thus, a first conditional probability 720A1 (e.g., P(GOAL1|QUERY)) and a second conditional probability 720A2 (e.g., P(GOAL2|QUERY)) through an Nth conditional probability 720AN (e.g., P(GOALN|QUERY), N being an integer) may be computed through, for example, the Bayesian statistical analysis employed in the present invention, with such conditional probabilities facilitating determining, by the inference engine 710, whether one or more informational goals can be inferred from the query 700. Although the first conditional probability 720A1 is illustrated as P(GOAL1|QUERY), it is to be appreciated that other conditional probability statements may be employed in accordance with the present invention. For example, a conditional probability P(UIG|QL, POS, PHR, KW, WBF) may be computed where UIG represents a user's informational goals, QL represents a Query Length, POS represents a set of Parts of Speech encountered in a query, PHR represents a set of phrases encountered in a query, KW represents a set of keywords encountered in a query and WBF represents a set of word based features encountered in a query. It is to be appreciated that other such conditional probabilities may be computed, stored and/or accessed in accordance with the present invention.

Figure 8:
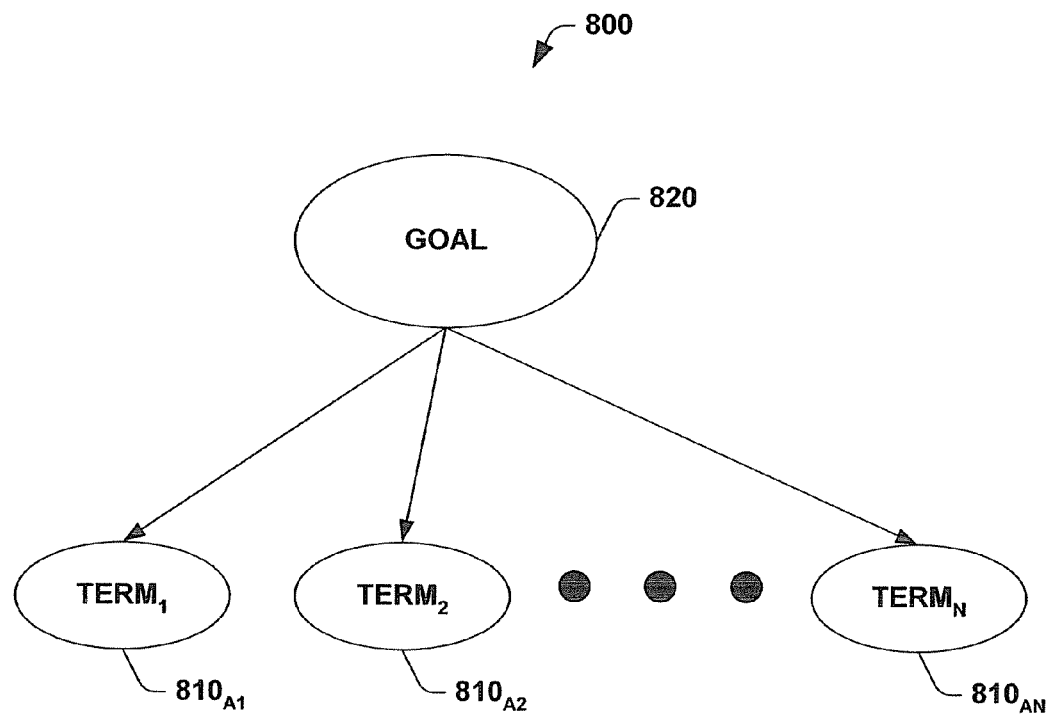
FIG. 8 is a schematic block diagram illustrating a Bayesian network associated with determining inferences, in accordance with an aspect of the present invention.

Referring now to FIG. 8 a Bayesian network 800 associated with determining inferences is illustrated. The Bayesian network 800 includes a first term 810A1, and a second term 810A2 through an Nth term 810AN, N being an integer (referred to collectively as the terms 810). Although N terms are illustrated in FIG. 8, it is to be appreciated that a greater or lesser number of terms may be employed in Bayesian networks employed in the present invention. The terms 810 can be employed in Bayesian inference to infer the likelihood of the goal 820 being associated with a query. The measure of the likelihood can be computed as a conditional probability and stored for access in one or more decision trees that are included in an inference model, for example. The Bayesian network 800 indicates that linguistic features can be employed to infer informational goals in questions. The Bayesian network 800 can be employed in creating and/or adapting an inference model that comprises a probabilistic dependency model.

Linguistic features referred to as "word-based features" can indicate the presence of one or more specific candidate terms that can be employed in predicting an informational goal. For example, in one example of the present invention, the word "make" was identified as a candidate for determining that an information consumer was interested in the process for constructing an object and/or in the composition of an object.

In one example aspect of the present invention, after training had been performed, predictions concerning the informational goals Information Need, Focus and Cover Wanted could be made based on analyzing the head-verb pre-modifier (e.g., what, how, who, many, define). Similarly, predictions concerning the informational goal Cover Would Give could be made based on analyzing the type of head verb (e.g., find, can, be, do, action verb). Further, predictions concerning the informational goal Topic could be made based on the number of nouns in a query and predictions concerning the informational goal Restriction could be made based on the part of speech found after the head-verb modifier (e.g., what is the deepest lake in Canada). It is to be appreciated that these example correlations employed in predicting certain informational goals from certain linguistic features and/or relationships between features represent but one possible set of correlations, and that other correlations can be employed in accordance with the present invention.

Figure 9:
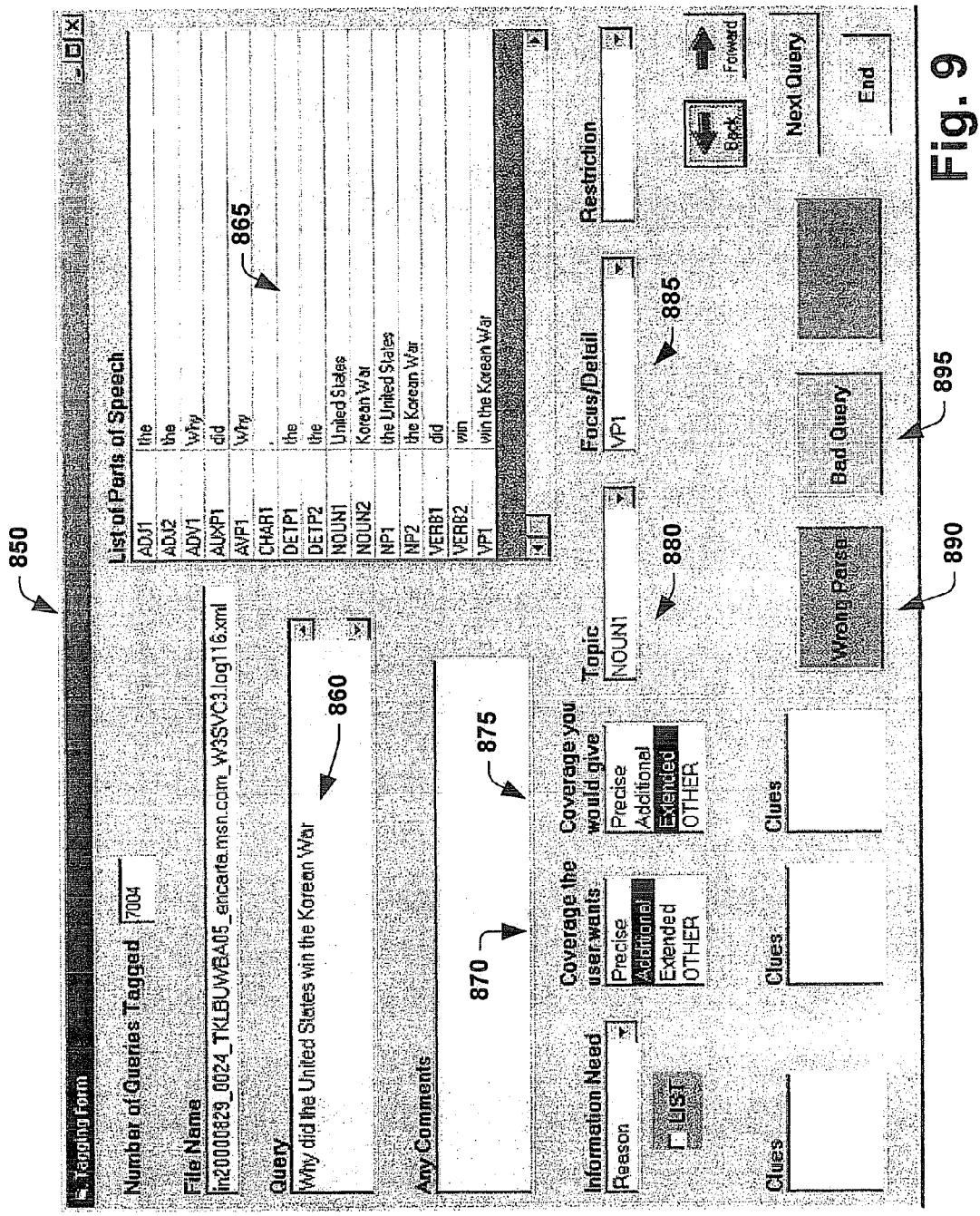
FIG. 9 is a simulated screen shot depicting a tagging tool employed in supervising learning, in accordance with an aspect of the present invention.

Referring now to FIG. 9 a simulated screenshot of an exemplary tagging tool 850 employed in supervising learning performed by the present invention is presented. The tagging tool 850 includes a query field 860 where the query being analyzed is displayed. In the simulated screenshot, a natural language processing process has parsed the query into parts of speech that are displayed in a parts of speech list 865. The parts of speech list 865 can have identifiers including, but not limited to, first adjective (ADJ1), second adjective (ADJ2), first verb (VERB1) and second verb (VERB2). In this manner, evaluating the operation of a natural language processor is facilitated. Further, the parts of speech listed in the parts of speech list 865 facilitate constructing and analyzing Bayesian networks like that depicted in FIG. 8.

The tagging tool 850 also includes a field 870 for displaying the coverage that a user desires. Information displayed in the field 870 may represent an inference generated by an aspect of the present invention. The tagging tool 850 also includes a field 875 for displaying the coverage that a tagger employed in supervised learning would assign to the query. In this way, the tagger can manipulate data and/or values generated by a parsing and/or tagging process, and can thus affect the computed conditional probabilities associated with the informational goal being inferred. The tagger may determine to manipulate the data and generated by the parsing and/or tagging process to make the data and values correspond to a prior schema associated with reasoning concerning the relevance of a part of a query. Such schemas may vary based on different language models. By way of illustration, if the coverage that the tagger infers matches the coverage that an inference engine determines that the user wants, then parameters related to machine learning may be adjusted to affirm the decision made by the inference engine to facilitate reaching such a desired decision during future analyses. By way of further illustration, if the coverage that the tagger infers does not match the coverage that an inference engine determines that the user wants, then parameters related to machine learning may be adjusted to reduce the likelihood that such an undesired decision may be made in future analyses.

The tagging tool 850 also includes a topic field 880 that can be employed to display the part of speech that an aspect of the present invention has determined infers the topic of the query. Again, the tagger may manipulate the value represented in the field 880 and thus provide feedback to the machine learner that will affect future inferences concerning topic. Similarly, the tagging tool 850 includes a focus field 885 that identifies the part of speech that an aspect of the present invention has determined infers the focus of the query. The tagger may manipulate the value represented in the field 885 and thus provide feedback to a machine learning process.

The tagging tool 850 also includes buttons that can be employed to process the query on a higher level than the field-by-field description provided above. For example, the tagging tool 850 includes a wrong parse button 890 that can be employed to indicate that the parse of the query was incorrect. Similarly, the tagging tool 850 includes a bad query button 895 that can be employed to selectively discard a query, so that the analysis of the query is not reflected in an inference model. However, bad queries may optionally be included while non-queries are discarded, for example.

Figure 10:
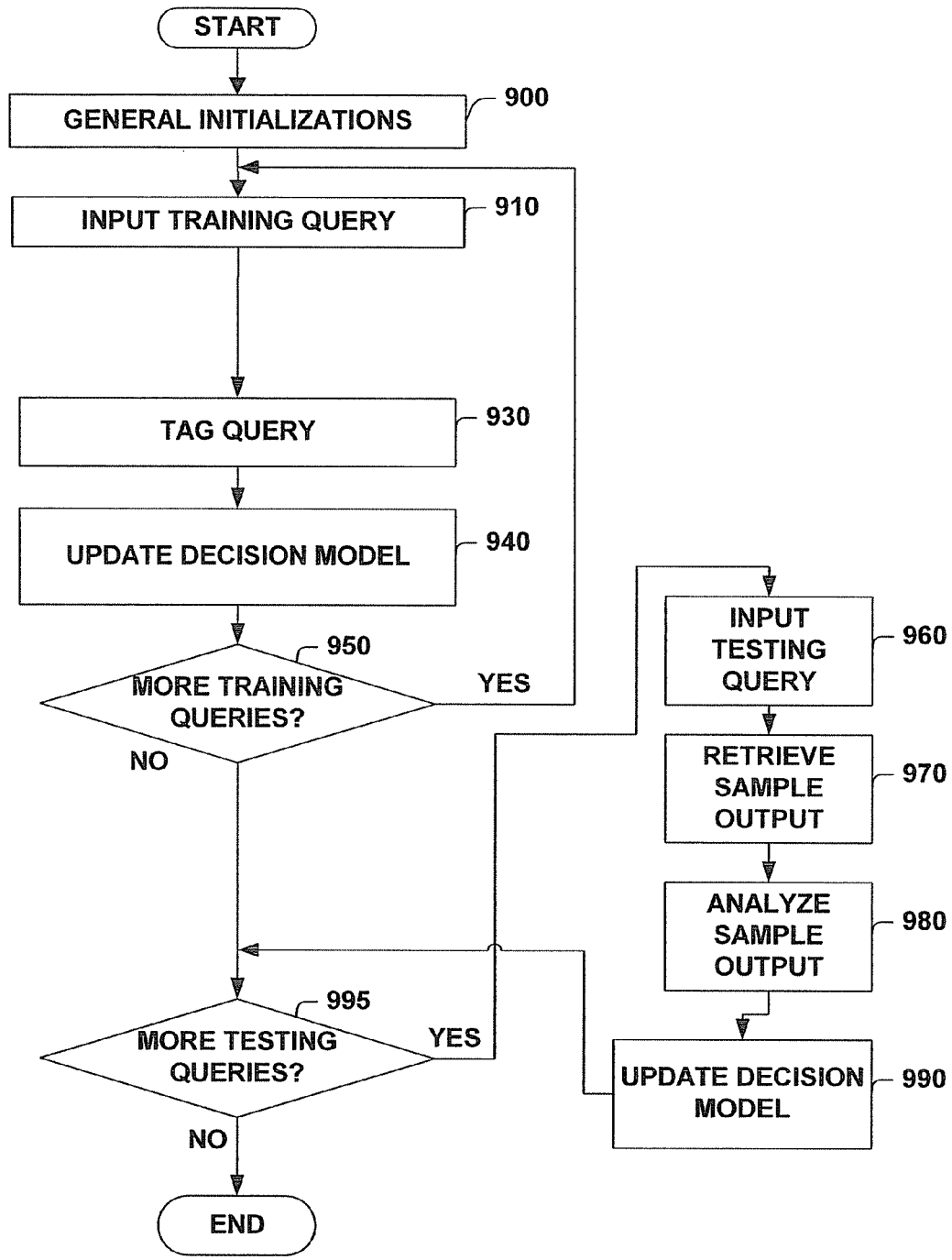
FIG. 10 is a flow chart illustrating a method for applying supervised learning and Bayesian statistical analysis to produce an inference model, in accordance with an aspect of the present invention.
Figure 11:
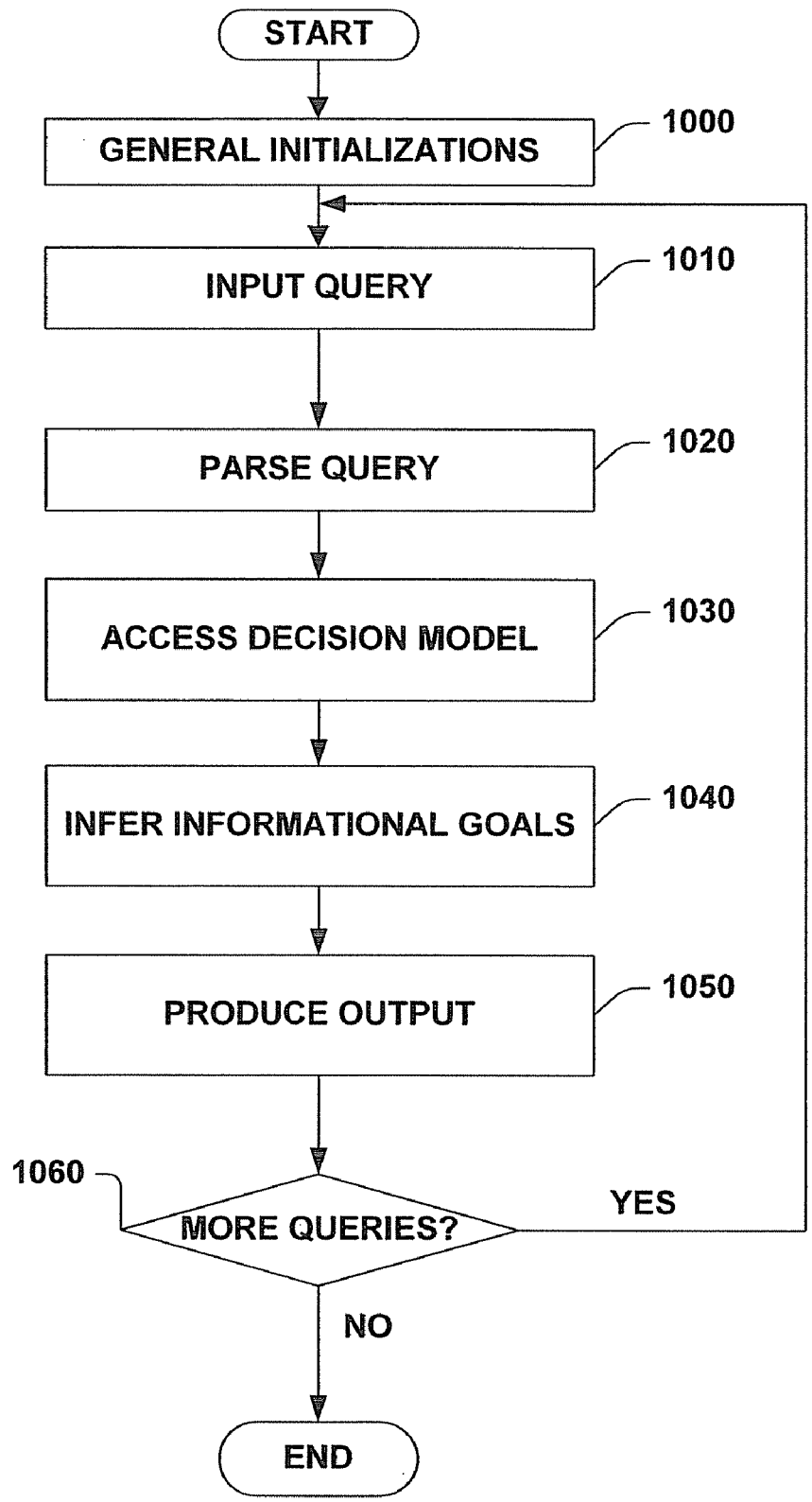
FIG. 11 is a flow chart illustrating a method for producing a response to a query where the response benefits from predicted informational goals retrieved from a decision model, in accordance with an aspect of the present invention.

In view of the exemplary systems shown and described above, a methodology, which may be implemented in accordance with the present invention, will be better appreciated with reference to the flow diagrams of FIGS. 10 and 11.

While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Turning now to FIG. 10, a flow chart illustrates a learning time method for applying supervised learning and Bayesian statistical analysis to produce an inference model. At 900, general initializations occur. Such initializations include, but are not limited to, allocating memory, establishing pointers, establishing data communications, acquiring resources, setting variables and displaying process activity. At 910, a training query is input. At 930 the query is tagged, which can include parsing the query. For example, different parts of speech may be identified, and different candidate inferences may be offered by training components associated with the present invention. As discussed in association with FIG. 9, such candidate inferences may be manipulated by a tagger to change the result of the analysis of the query being tagged. At 940, a decision model can be updated based on the results of the analysis and tagging of 930. At 950 a determination is made concerning whether more training queries are to be presented to the method. If the determination at 950 is YES, then processing returns to 910 where the next training query is input. If the determination at 950 is NO, then processing continues at 995.

At 995, a determination is made concerning whether more testing queries are going to be presented to the method. If the determination at 995 is NO, then processing concludes. If the determination at 995 is YES, then processing continues at 960 where a testing query is input. At 970, sample output based on the query is produced. The output can include, but is not limited to, an answer to the query, parse data associated with the query, linguistic data associated with the query, and potential updates to one or more data structures in one or more decision models. At 980, the sample output produced at 970 is analyzed to determine inference accuracy, for example. At 990, based on data and/or statistics associated with the analysis of 980 a flag can be set to indicate that the decision model should be further updated. For example, an accuracy rate below fifty percent may indicate that further training of the decision model is warranted or additional factors should be incorporated in the inference model.

Turning now to FIG. 11, a flow chart illustrates a run time method for producing a response to a query where the response can benefit from predicted informational goals retrieved from a decision model. At 1000, general initializations occur. Such initializations include, but are not limited to, allocating memory, establishing pointers, establishing data communications, acquiring resources, setting variables and displaying process activity. At 1010 a query is input. The query may be generated, for example, by a human using a browser application or by a computer process performing automated information retrieval (e.g., clipping service). At 1020 the query is parsed into parts and linguistic data is generated. At 1030, one or more decision models are accessed using data generated by the parsing of 1020. By way of illustration, one or more parts of speech and/or linguistic data may be employed to select one or more decision models to access, and those parts of speech may then be employed to access one or more data structures in the decision model. By way of further illustration, a first noun may be employed to select a first decision model, and that first noun may then be employed to begin a traverse of a decision tree associated with the first decision model to retrieve a conditional probability that an informational goal can be inferred from the presence of the noun. For example, the first noun may be employed to advance the traverse one level in the tree and then another linguistic feature (e.g., a type of head verb) can be employed to facilitate advancing to the next level and so on.

At 1040, the one or more conditional probabilities can be examined to determine which, if any, informational goals can be inferred from the query. At 1050, based at least in part on the informational goals, if any, inferred at 1040, the run time method can produce an output. The output can include, but is not limited to, an answer responsive to the new query, a rephrased query, a query that can be employed in query by example processing or an error code. At 1060 a determination is made concerning whether any more queries are to be presented to the method. If the determination at 1060 is YES, then processing can continue at 1010. If the determination at 1060 is NO, then processing can conclude.

Figure 12:
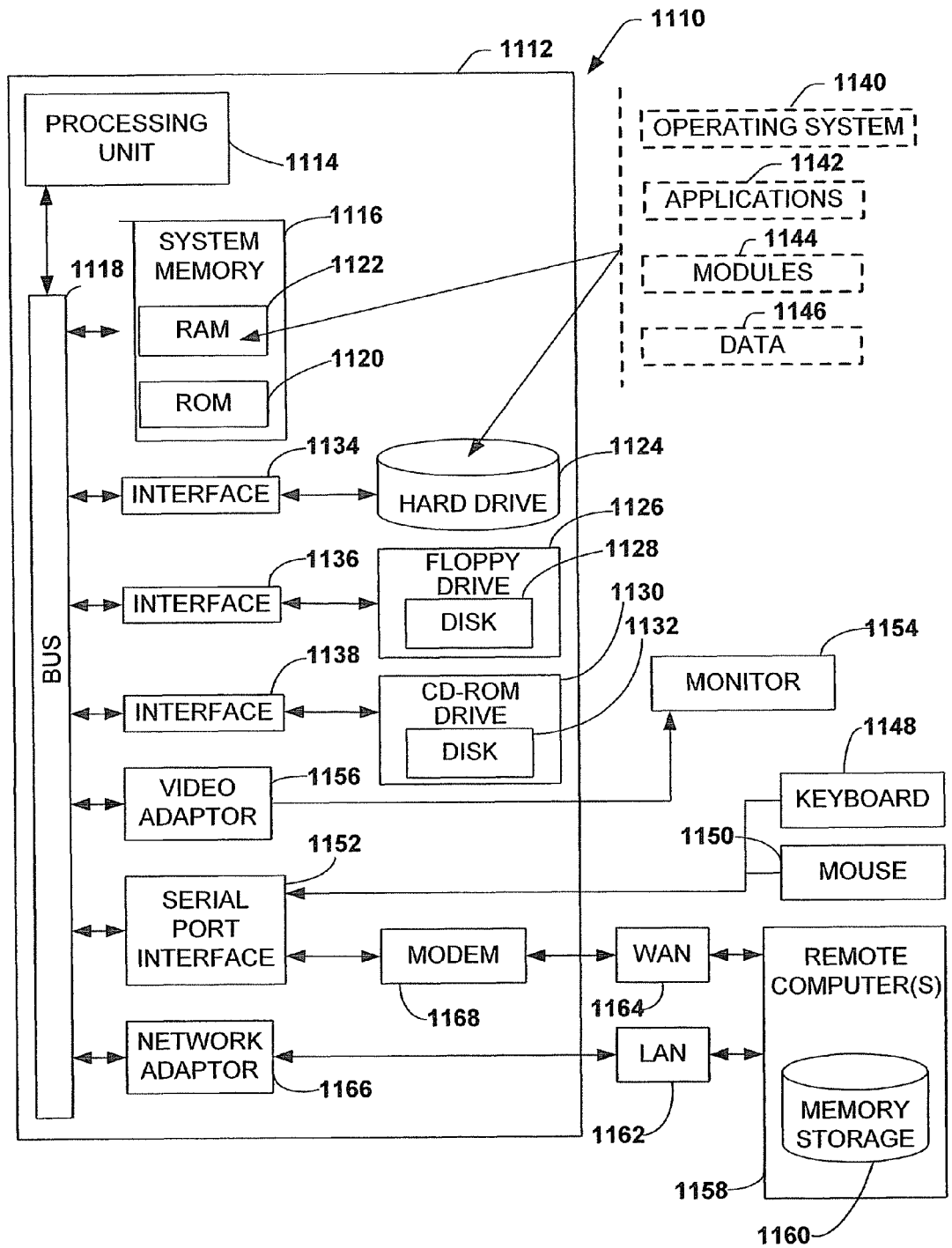
FIG. 12 is a schematic block diagram of an exemplary operating environment for a system configured in accordance with the present invention.

In order to provide additional context for various aspects of the present invention, FIG. 12 and the following discussion are intended to provide a brief, general description of one possible suitable computing environment 1110 in which the various aspects of the present invention may be implemented. It is to be appreciated that the computing environment 1110 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1110 for implementing various aspects of the invention includes a computer 1112, including a processing unit 1114, a system memory 1116, and a system bus 1118 that couples various system components including the system memory to the processing unit 1114. The processing unit 1114 may be any of various commercially available processors. Dual microprocessors and other multi-processor architectures also can be used as the processing unit 1114.

The system bus 1118 may be any of several types of bus structure including a memory bus or memory controller, a peripheral bus, and a local bus using any of a variety of commercially available bus architectures. The computer 1112 memory includes read only memory (ROM) 1120 and random access memory (RAM) 1122. A basic input/output system (BIOS), containing the basic routines that help to transfer information between elements within the computer 1112, such as during start-up, is stored in ROM 1120.

The computer 1112 further includes a hard disk drive 1124, a magnetic disk drive 1126, e.g., to read from or write to a removable disk 1128, and an optical disk drive 1130, e.g., for reading a CD-ROM disk 1132 or to read from or write to other optical media. The hard disk drive 1124, magnetic disk drive 1126, and optical disk drive 1130 are connected to the system bus 1118 by a hard disk drive interface 1134, a magnetic disk drive interface 1136, and an optical drive interface 1138, respectively. The drives and their associated computer-readable media provide nonvolatile storage of data, data structures, computer-executable instructions, etc. for the computer 1112, including for the storage of broadcast programming in a suitable digital format. Although the description of computer-readable media above refers to a hard disk, a removable magnetic disk and a CD, it should be appreciated that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 1122, including an operating system 1140, one or more application programs 1142, other program modules 1144, and program non-interrupt data 1146. The operating system 1140 in the illustrated computer can be any of a number of available operating systems.

A user may enter commands and information into the computer 1112 through a keyboard 1148 and a pointing device, such as a mouse 1150. Other input devices (not shown) may include a microphone, an IR remote control, a joystick, a game pad, a satellite dish, a scanner, or the like. These and other input devices are often connected to the processing unit 1114 through a serial port interface 1152 that is coupled to the system bus 1118, but may be connected by other interfaces, such as a parallel port, a game port, a universal serial bus ("USB"), an IR interface, etc. A monitor 1154, or other type of display device, is also connected to the system bus 1118 via an interface, such as a video adapter 1156. In addition to the monitor, a computer typically includes other peripheral output devices (not shown), such as speakers, printers etc.

The computer 1112 may operate in a networked environment using logical connections to one or more remote computers, such as a remote computer(s) 1158. The remote computer(s) 1158 may be a workstation, a server computer, a router, a personal computer, microprocessor based entertainment appliance, a peer device or other common network node, and typically includes many or all of the elements described relative to the computer 1112, although, for purposes of brevity, only a memory storage device 1160 is illustrated. The logical connections depicted include a local area network (LAN) 1162 and a wide area network (WAN) 1164. Such networking environments are commonplace in offices, enterprise-wide computer networks, intranets and the Internet.

When used in a LAN networking environment, the computer 1112 is connected to the local network 1162 through a network interface or adapter 1166. When used in a WAN networking environment, the computer 1112 typically includes a modem 1168, or is connected to a communications server on the LAN, or has other means for establishing communications over the WAN 1164, such as the Internet. The modem 1168, which may be internal or external, is connected to the system bus 1118 via the serial port interface 1152. In a networked environment, program modules depicted relative to the computer 1112, or portions thereof, may be stored in the remote memory storage device 1160. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for inferring an information goal given a query, comprising:
   a query subsystem that receives a user query and extrinsic data relating to the user, the query subsystem operatively coupled to an inference model and a knowledge data store, the query subsystem comprising:
   an inference engine that infers one or more informational goals and a preferred level of detail for an answer to the query,
   the inference based at least in part on the query,
   the extrinsic data, and
   inference data stored in the inference model, wherein the extrinsic data includes at least informational content being displayed to the user at the time the query is received.

2. The system of claim 1, where the informational goals include at least one of a type of information requested in the query, a topic of the query, and a focal point of the query.

3. The system of claim 2, comprising:
   an input query log that stores one or more queries and one or more pieces of extrinsic data; and
   a learning system operatively coupled to the input query log, the learning system produces and refines the inference model.

4. The system of claim 3, where the learning system comprises:
   a natural language processor that parses the query to produce linguistic data relating to one or more linguistic features;
   a tagging tool that facilitates manipulating the linguistic data; and
   one or more taggers that manipulates the linguistic data.

5. The system of claim 4, wherein the linguistic data comprises a parse tree, the parse tree containing extractable information concerning the nature of and relationships between observable linguistic features.

6. The system of claim 5, wherein the observable linguistic features in the extractable information comprise at least one of word-based features, structural features, and hybrid linguistic features.

7. The system of claim 6, wherein the word-based features indicate the presence of one or more candidate terms useful in predicting an informational goal.

8. The system of claim 4, wherein the inference model comprises one or more decision trees, the decision trees storing conditional probabilities associated with one or more informational goals, the decision trees traversable by the linguistic data.

9. The system of claim 3, wherein the natural language processor parses the query into one or more parts suitable for retrieving one or more conditional probabilities stored in the inference model.

10. The system of claim 9, wherein the one or more parts comprise at least one of logical forms, adjectival phrases, adverbial phrases, noun phrases, verb phrases, prepositional phrases, or parse trees.

11. The system of claim 10, the inference engine infers one or more informational goals based on at least one of the query, the extrinsic data, the one or more parts, or the one or more conditional probabilities stored in the inference model.

12. The system of claim 3, the query subsystem further comprising an answer generator that produces one or more responses to the query, wherein the one or more responses are based at least on the inferred informational goals and the preferred level of detail.

13. The system of claim 12, wherein the one or more responses vary in at least one of length, precision, or detail based at least on the inferred informational goals and the preferred level of detail.

14. A method using a microprocessor for presenting answers to queries, comprising:
    receiving a query from a user;
    parsing the query into component parts of speech and logical forms to produce parse data;
    receiving extrinsic data relating to the user, the extrinsic data including at least informational content being displayed to the user at the time the query is received;
    employing the parse data and the extrinsic data to infer one or more informational goals and a preferred level of detail for answers to the query;
    generating at least one answer to the query in accordance with the inferred informational goals and preferred level of detail.

15. The method of claim 14, wherein parsing the query comprises determining at least one of sentence structure, sentence length, sentence phrasing, common word regularity, or common word non-regularity.

16. The method of claim 14, further comprising selecting a set of resources in which to search for an answer to the query based at least on the inferred informational goals.

17. The method of claim 14, further comprising presenting a user interface dialog to the user to facilitate manual confirmation of the inferred level of detail or the extrinsic data.

18. The method of claim 14, further comprising
    submitting the parse data to a decision model storing conditional probabilities concerning a likelihood that specific informational goals are related to a query; and
    retrieving predicted informational goals from the decision model given the submitted parse data.

19. The method of claim 18, further comprising selecting the decision model based at least on linguistic data parsed from the query.

20. A system for generating a response to a query at a preferred level of detail, comprising:
    means for inputting a query from a user;
    means for parsing the query into component parts of speech and logical forms to produce parse data;
    means for employing the parse data to access a decision model, the decision model storing conditional probabilities concerning a likelihood that specific informational goals are related to a query;
    means for receiving extrinsic data, the extrinsic data including at least informational content displayed to the user at the time the query is inputted;
    means for employing the decision model and the extrinsic data to infer one or more informational goals associated with the query and a preferred level of detail for an response to the query; and
    means for producing a response to the query in accordance with the inferred informational goals and preferred level of detail.

* * * * *